United States Patent

[11] 3,583,461

| [72] | Inventor | Samuel Klaus<br>Philadelphia, Pa. |
|---|---|---|
| [21] | Appl. No. | 822,454 |
| [22] | Filed | May 7, 1969 |
| [45] | Patented | June 8, 1971 |
| [73] | Assignee | Standard Pressed Steel Co.<br>Jenkintown, Pa. |

[54] FASTENER AND RETAINING MEANS THEREFOR
9 Claims, 3 Drawing Figs.

[52] U.S. Cl. .................................................. 151/41.7,
151/69
[51] Int. Cl. ............................................. F16b 39/00
[50] Field of Search .......................................... 151/69,
41.7

[56] References Cited
UNITED STATES PATENTS

| 2,919,736 | 1/1960 | Kann | 151/69 |
| 2,991,816 | 7/1961 | Harbison et al. | 151/69X |
| 3,128,813 | 4/1964 | Davis et al. | 151/69X |
| 3,137,336 | 6/1964 | Wing | 151/69X |
| 3,217,774 | 11/1965 | Pelochino | 151/69 |
| 3,289,726 | 12/1966 | Sauter | 151/69 |
| 3,397,727 | 8/1968 | Orosz | 151/69 |

*Primary Examiner*—David J. Williamowsky
*Assistant Examiner*—Andrew V. Kundrat
*Attorneys*—Stanley Belsky and Curtis, Morris and Safford ABSTRACT: A stressed panel fastener utilizing a sleeve bolt which is positively retained in a coined ring imbedded in a stressed panel by a serpentine circumferential retaining spring held within a groove in the coined ring. The spring is interwoven through extending retaining fingers on the end of the sleeve bolt thereby to positively retain the sleeve bolt within the ring even in the event the spring is broken at one or more places.

PATENTED JUN 8 1971

3,583,461

INVENTOR.
SAMUEL KLAUS

BY Curtis, Morris & Safford
ATTORNEYS

FASTENER AND RETAINING MEANS THEREFOR

This invention pertains to fasteners and retaining means therefor and more in particular to fasteners such as sleeve bolts retained in a stressed panel member by means of a circumferentially disposed spring which grips the sleeve bolt and is held against movement in a groove in a coined retaining ring embedded in the stressed panel.

While fasteners and fastener retainers in accordance with this invention may be employed in many diverse applications, they are particularly adaptable where panels or other planar parts are to be secured to a frame member and wherein many closely spaced fasteners are employed. A particular use, for example, is in aircraft assembly where panels of various shapes and sizes are removably mounted by means of a number of fasteners disposed about the periphery of the panel. Such panels are designed for ready installation and are designed to be removable in order to provide access to the structural frame of the aircraft for periodic maintenance and the like. Hence, it is desirous that a fastener assembly be employed wherein the fastener member is positively retained within the panel members such that the fastener is not inadvertently lost, misplaced or removed from the panel. In this manner, installation is readily simple as the panel is held in place against the structural member and the fastener therein, for example a sleeve bolt, is screwed into engagement with a stud positioned within the structural frame member. It is therefore extremely important for the effectiveness of this type of fastener that the sleeve bolt carried by the panel be positively retained therein, and be provided with a feature such that even if the fastener is subject to abuse, i.e., as by banging, it always remains positively retained in the panel.

Accordingly, it is an object of the present invention to provide a fastener and retainer therefor which is adapted to be carried in a screw hole of a panel and to be positively retained therein against inadvertent displacement.

Another object of the present invention is to provide a fastener and retainer which is readily applicable to an opening in a structural member through which the fastener is to extend so that the fastener is freely rotatable in the opening but is precluded from inadvertent displacement therefrom.

Yet another object of the present invention is to provide a means of retaining a fastener member such as a sleeve bolt in a panel member such that it is precluded from inadvertent removal therefrom by utilizing a peripheral serpentine retaining spring which grips the sleeve bolt and prevents its removal from the panel member even if the spring is broken.

These and other objects of the invention will be more apparent from consideration of the following specification and the accompanying drawing wherein.

Figure 1:
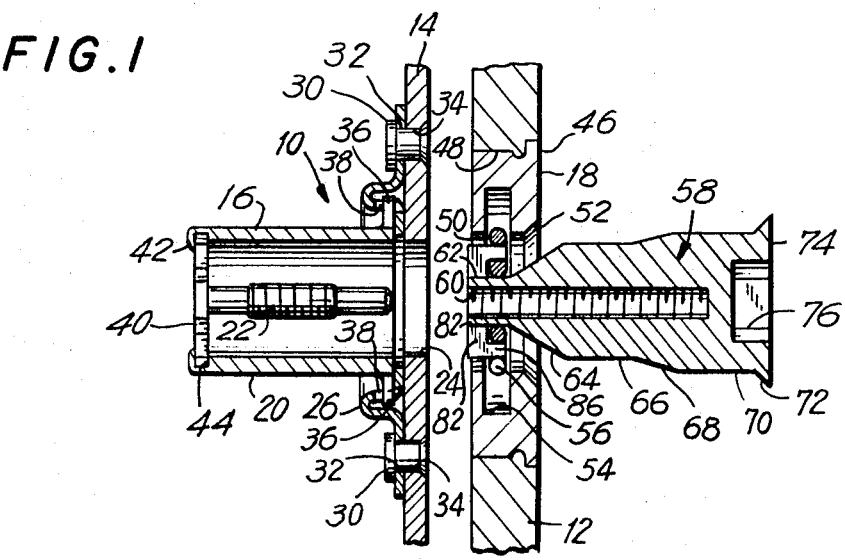
FIG. 1 is a vertical sectional view showing the fastener assembly situated in two facing structural members prior to installation.
Figure 2:
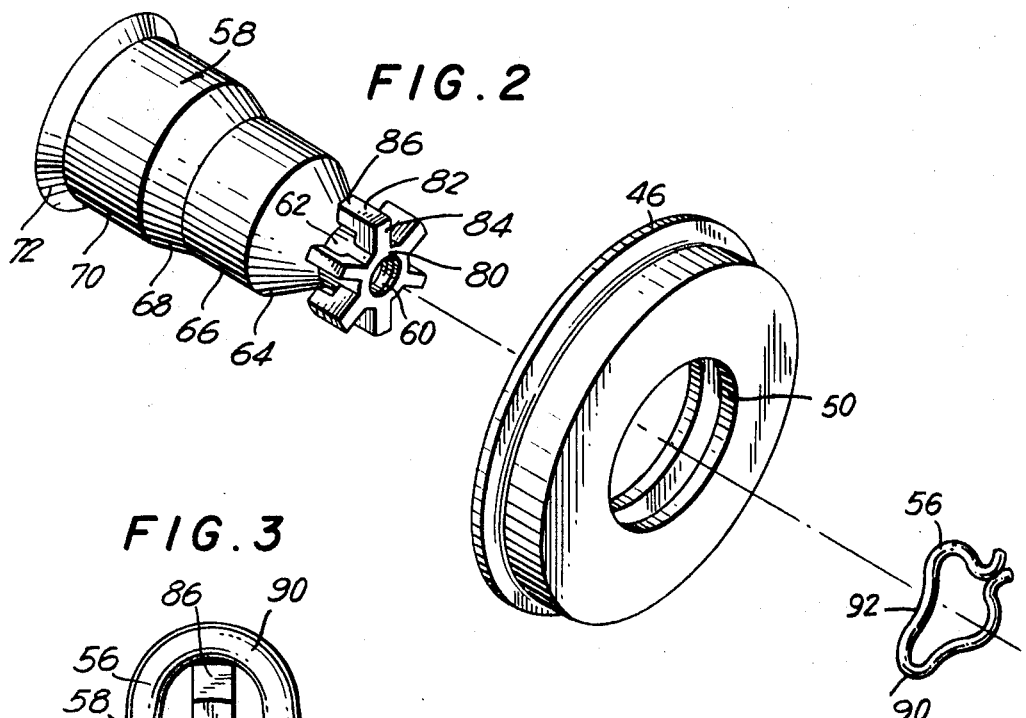
FIG. 2 is an exploded perspective view showing the sleeve bolt, coined ring and serpentine spring.

With reference to the drawing and particularly FIG. 1, there is shown a stressed panel fastener assembly 10, shown illustratively for securing a stressed panel member 12 to a structural support member 14. The fastener assembly 10 comprises two subassemblies 16 and 18 carried respectively by the structural frame member 14 and the stressed panel 12.

Subassembly 16 includes a fastener support housing 20 which positively retains and orients an extending externally threaded stud member 22 such that the stud member 22 is accessible through an aperture 24 in structural member 14. The support housing 16 is retained on structural member 14 in any suitable manner, for example, by flanged retaining ring 26 having a flange extension which is secured to the structural member 14 by rivets 30 extending through receiving apertures 32 in the flange and 34 in the structural member 14. Housing 20 is positively retained within flanged retaining ring 26 by means of laterally extending tabs 36 which extend through tab receiving slots 38 in a wall of ring 26. Stud 22 is also suitably retained in the housing 20 by means of a flanged collar 40 rigidly secured to the end of stud 22 and suitably retained in housing 20, for example by crimping tabs 42 which hold collar 40 against a shoulder 44 of housing 20.

Subassembly 18 of the fastener assembly 10 is carried in a panel of member 12 and includes a coined ring member 46 which is rigidly secured within an aperture 48 of panel 12, for example, by press fit. The ring 46 includes a receiving aperture 50 therethrough which is countersunk as at 52. An internal annular groove 54 is provided to retain a serpentine retaining spring member 56 therein.

A sleeve bolt 58 having an internally threaded bore 60 therein is positioned within the aperture 50 of coined ring 46 and is positively retained therein by the serpentine spring member 56.

Sleeve bolt 58 has an exterior surface which includes a first generally cylindrical surface 62, a frustoconical exterior surface 64, a cylindrical surface 66, a second frustoconical surface 68, a third cylindrical surface 70 and a fourth frustoconical surface 72 which is dimensioned to seat within the countersink 52 on the retaining ring 46. The head 74 of sleeve bolt 58 includes a socket head 76 although any standard driving head may be employed.

The initial position of the sleeve bolt is shown in FIG. 1 and at assembly panel 12 is moved flush against support member 14 such that the threaded bore 60 of sleeve bolt 58 is in register with the stud 22 mounted on structural member 14. Sleeve bolt 58 is then rotated relative to stud member 22 and simultaneously pushed toward structural member 14. Spring 56 is confined within annular groove 54 of ring 46 and cannot move out of the groove and due to its inherent resiliency spring 56 expands radially outwardly as sleeve bolt 58 is pushed into engagement with stud 22. As sleeve bolt 58 is pushed toward structural member 14 the frustoconical surface 64 acts as a camming surface and radially expands spring 56 outwardly until the spring is resting on the second cylindrical surface 66. As bolt 58 is rotated further, the threaded surface 60 engages the threaded surface on stud 22 and bolt 58 becomes threadedly engaged thereon forcing spring 56 to expand radially outwardly again due to the camming action of frustoconical surface 68 until bolt 58 is seated flush within the countersink 52 of coined ring 46.

Fitted on the end of bolt 58 is a collar 80 which has a plurality of radially extending protrusions 82 extending therefrom. Protrusions 82 include a first radially extending leg 84 and a second axially extending leg 86 spaced from the exterior surface 62 of sleeve bolt 58.

Figure 3:
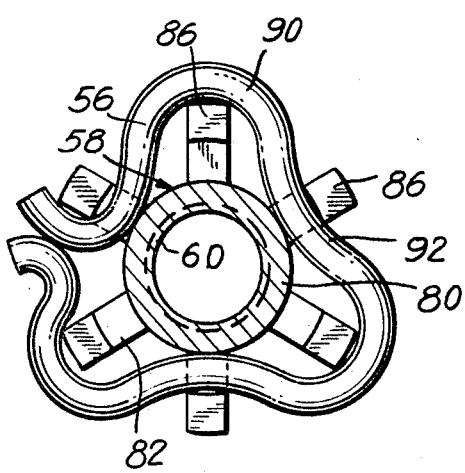
FIG. 3 is a sectional view taken through the end of the sleeve bolt showing the serpentine spring retained therein.

Serpentine spring 56 includes a plurality of looped configurations 90 and 92 and is placed, as seen in FIG. 3, so that the loops of the spring wind serpentine fashion within and without the leg extensions 86.

Thus, it is seen that the gripping surfaces 86 of the finger extensions positively retain and grip the spring member 56 so that the sleeve bolt 58 may not be inadvertently removed from the coined collar 46. The plurality of gripping surfaces afforded by the finger extension 86 also advantageously provide an additional spring retaining feature which insures that in the event spring 56 is broken at one or more points, due to abusive treatment of the panel member in transit or at installation, the fingers still retain a sufficient gripping surface about the spring member 56 so that the spring is positively retained within the annular groove 54. Thus, despite the fact that spring 56 may be broken, the collar 80 with its finger extensions still maintains a positive spring gripping surface preventing the inadvertent removal of the sleeve bolt 58.

The present invention thus provides an improved retaining means for keeping a sleeve bolt positioned within a coined retaining ring in a panel member so that it may not be inadvertently removed or lost.

What I claim is:

1. A stressed panel fastener assembly including a sleeve bolt and a structural member having an aperture therein, means within said aperture to orient said sleeve bolt, a generally annular serpentine retaining spring within said orienting means to frictionally grip and retain said sleeve bolt against inadvertent removal and means on said sleeve bolt to positively grip both the inner and outer periphery of said retaining spring.

2. A stressed panel fastener assembly as defined in claim 1 wherein said orienting means is a retaining ring secured to said structural member including a bolt receiving aperture therethrough and an annular groove within said ring to house said retaining spring.

3. A stressed panel fastener assembly as defined in claim 1 wherein said retaining spring is adapted to fit circumferentially about said sleeve bolt and frictionally grip said sleeve bolt.

4. A stressed panel fastener assembly including a sleeve bolt and a structural member having an aperture therein, means within said aperture to orient said sleeve bolt, a retaining spring within said orienting means to frictionally grip and retain said sleeve bolt against inadvertent removal and means on said sleeve bolt to positively grip said retaining spring at a plurality of locations, said retaining spring comprising a serpentine spring configuration adapted to fit circumferentially about said sleeve bolt and frictionally grip said sleeve bolt, said gripping means on said sleeve bolt including a plurality of radially extending gripping surfaces adapted to fit between the convolutions of said serpentine spring thereby to increase the spring gripping surface area.

5. A stressed panel fastener assembly as defined in claim 4 wherein each said radially extending gripping surfaces comprises a first leg extending radially outwardly from said sleeve bolt and second leg spaced from the periphery of said sleeve bolt and extending substantially parallel thereto thereby providing a spring retaining surface defined by the peripheral wall of said sleeve bolt and the interior surface of said second leg.

6. A stressed panel fastener assembly as defined in claim 5 wherein said serpentine spring is disposed within and without said radially extending gripping surfaces with alternate convolutions of said spring being positioned alternately over and under said second legs.

7. A stressed panel fastener assembly comprising, in combination, a stud retaining housing adapted to be positioned in a structural member, said housing including means to maintain an externally threaded stud member in register with a bolt receiving aperture in said structural member, a sleeve bolt fastener assembly adapted to be positioned in a mating structural member such that when said structural members are placed in abutting face-to-face relationship said sleeve bolt is oriented adjacent said aperture and in register with said stud member, means within said mating structural member to retain said sleeve bolt therein comprising a retaining ring rigidly fixed within said mating structural member, said ring having an annular groove adapted to house a retaining spring member therein, said spring member having a substantially circular serpentine configuration to frictionally hold said sleeve bolt therein, said sleeve bolt including a plurality of radially extending spring gripping surfaces thereby to positively grip said spring at a plurality of circumferentially spaced locations.

8. A stressed panel fastener assembly as defined in claim 7 wherein said radially extending gripping surfaces on said sleeve bolt comprise a generally L-shaped leg member with one leg of said L-shaped member being spaced from the peripheral wall of said sleeve bolt thereby to define a spring gripping surface between the peripheral wall of said sleeve bolt and the interior surface of said one leg.

9. A stressed panel fastener assembly as defined in claim 8 wherein said serpentine spring is disposed alternately within and without said plurality of leg members and is confined within said annular groove thereby to positively retain said sleeve bolt within said mating structural member to preclude inadvertent displacement of said sleeve bolt.